United States Patent [19]

Palmer et al.

[11] Patent Number: 5,221,581
[45] Date of Patent: Jun. 22, 1993

[54] COATING COMPOSITION OF A GLYCIDYL ACRYLIC POLYMER, AN AMINOESTER ACRYLIC POLYMER AND A POLYESTER OR A POLYESTERURETHANE

[75] Inventors: George T. Palmer, Troy; Ruth A. Theobald, Birmingham, both of Mich.

[73] Assignee: E. I. Du Pont de Nemours and Company, Wilmington, Del.

[21] Appl. No.: 629,477

[22] Filed: Dec. 18, 1990

[51] Int. Cl.$^5$ .................. B32B 15/08; B32B 27/08; C08L 33/12; C08L 33/14
[52] U.S. Cl. .................. 428/425.8; 428/423.1; 428/458; 428/480; 524/114; 524/507; 524/513; 525/125; 525/166
[58] Field of Search .................. 524/513, 507, 114; 525/125, 166; 428/423.1, 425.8, 458, 480

[56] References Cited

U.S. PATENT DOCUMENTS

| | | | |
|---|---|---|---|
| 3,573,709 | 8/1973 | Staudenmayer et al. | 96/1.5 |
| 3,671,244 | 6/1972 | Bissonette et al. | 96/54 |
| 3,795,517 | 3/1974 | Sutton | 96/1.5 |
| 4,054,232 | 10/1977 | Cawley | 222/107 |
| 4,115,124 | 9/1978 | Hamilton et al. | 96/82 |
| 4,118,375 | 10/1978 | Linder et al. | 526/240 |
| 4,144,208 | 3/1979 | Fuchs et al. | 260/27 |
| 4,181,526 | 1/1980 | Blakey et al. | 430/67 |
| 4,408,018 | 10/1983 | Bartman et al. | 525/300 |
| 4,525,521 | 6/1985 | DenHartog et al. | 524/517 |
| 4,623,676 | 11/1986 | Kistner | 522/15 |
| 4,668,601 | 5/1987 | Kistner | 430/162 |
| 4,755,565 | 7/1988 | Snow | 525/379 |
| 4,785,354 | 11/1988 | Snow | 525/208 |

FOREIGN PATENT DOCUMENTS 3149797 6/1983 Fed. Rep. of Germany.
1027886 3/1976 Japan.
1388381 3/1975 United Kingdom.

OTHER PUBLICATIONS

Publication No. X-263 A Dec. 1986, Eastman Developmental Products, Kodak, 3 pp.

Primary Examiner—Patricia A. Short
Attorney, Agent, or Firm—Hilmar L. Fricke

[57] ABSTRACT

A coating composition which cures at ambient temperatures and contains a binder and a solvent for the binder, wherein the binder contains about:

A. an acrylic polymer A having pending from the polymer backbone aminoester groups, hydroxy aminoester groups or hydroxyamine groups,
B. an acrylic crosslinking polymer B of polymerized monomers of at least 3% by weight of a glycidyl constituent of glycidyl methacrylate or acrylate, and the remainder of the monomers are alkyl methacrylate an acrylate each having 1-12 carbon atoms in the alkyl group;
C. a polyester or polyesterurethane polymer C having at least 2 pendant groups of the formula $$-O-\overset{O}{\underset{\|}{C}}-CH_2-\overset{O}{\underset{\|}{C}}-CH_3;$$

the composition is useful as an exterior finish for automobiles and trucks and for repairing finishes of automobiles and trucks.

21 Claims, No Drawings

COATING COMPOSITION OF A GLYCIDYL ACRYLIC POLYMER, AN AMINOESTER ACRYLIC POLYMER AND A POLYESTER OR A POLYESTERURETHANE

BACKGROUND OF THE INVENTION

This invention is related to a coating composition and in particular to a coating composition that cures rapidly at ambient temperatures to form a finish with improved initial properties such as improved flexibility, chip resistance, recoat lift resistance i.e., resistance to lifting of the cured paint when repainted, and impact resistance.

There are a number of coating compositions available for finishing and repairing of the exterior finish of automobiles and trucks. These compositions cure at ambient temperatures and provide finishes with good physical properties such as gloss, hardness, weatherability, good adhesion, chip resistance and the like. Typical useful compositions are shown in Den Hartog et al U.S. Pat. No. 4,525,521 issued Jun. 25, 1985; however, it would be very desirable if these compositions would have a faster initial curing rate along with improved properties such as flexibility and impact reistance without a sacrifice of any of the other acceptable properties of the compositions.

Other useful compositions are shown in Crawley et al U.S. Pat. No. 4,131,571 issued Dec. 26, 1978, Miller U.S. Pat. No. 4,020,216 issued Apr. 26, 1977, Miller U.S. Pat. No. 3,844,993 issued Oct. 29, 1974, Miller U.S. Pat. No. 3,789,037 issued Jan. 29, 1974 and Vasta U.S. Pat. No. 3,558,564 issued Jan. 26, 1971. These compositions contain isocyanate compounds to achieve curing and resulting excellent properties. It would be desirable to provide an ambient temperature curing composition that has the advantages of the above compositions but does not contain an isocyanate compound.

The novel composition of this invention has a rapid initial cure rate, i.e., crosslinks quickly at ambient temperatures and provides excellent initial properties such as moisture and tape marking resistance, has an acceptable pot life, forms a finish with improved flexibilty, chip resistance, recoat lift resistance and impact resistance in comparison to the finishes formed from the aforementioned compositions and still has excellent durability and has the other properties that are necessary for exterior finishes for automobiles and trucks and has the added advantage of not containing an isocyanate compound.

SUMMARY OF THE INVENTION

A coating composition containing about 20-80% by weight of a binder and 80-20% by weight of a solvent for the binder, wherein the binder contains about:

A. 50-70% by weight, based on the weight of the binder, of an acrylic polymer A of polymerized monomers of methyl methacrylate and monomers selected from the group of styrene, alkyl methacrylate and alkyl acrylate each having 2-12 carbon atoms in the alkyl group and the polymer has pending from the carbon-carbon atoms of the polymer backbone aminoester groups of the formula

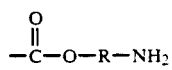

where R is an alkylene group having 2-3 carbon atoms; or hydroxy aminoester groups of the formula

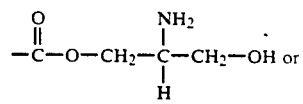

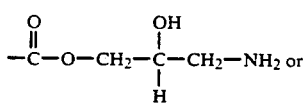

groups of the formula

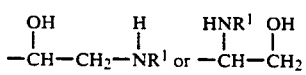

where $R^1$ is an alkyl group of 1-8 carbon atoms; and

B. 2-30% by weight, based on the weight of the binder, of an acrylic crosslinking polymer B of polymerized monomers of at least 3% by weight, based on the weight of the crosslinking polymer, of a glycidyl constituent selected from the group of glycidyl methacrylate and glycidyl acrylate, and optionally contains an alkyl acrylate or methacrylate having a pendant group of the formula

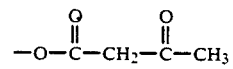

and the remainder of the monomers are selected from the group of alkyl methacrylate and alkyl acrylate or mixtures thereof each having 1-12 carbon atoms in the alkyl group;

C. 5-48% by weight, based on the weight binder, of polymer C of a polyester or a polyesterurethane polymer containing at least two pendant groups of the formula

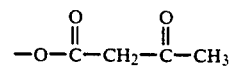

wherein polymers A and B each have a weight average molecular weight of about 5,000-40,000 and polymer C has a weight average molecular weight of about 300-10,000; the molecular weights are determined by gel permeation chromatography using polymethyl methacrylate as a standard.

DETAILED DESCRIPTION OF THE INVENTION

The coating composition contains about 20-80% by weight of a film forming binder and 80-20% by weight of solvent for the binder. The binder is a blend of about 50-70% by weight of acrylic polymer A. 2-30% of acrylic crosslinking polymer B and 5-48% by weight of polymer C. The composition can be a clear finish without pigments or only lightly pigmented while retaining its clear characteristics or can be pigmented and used as a conventional monofinish or as the color coat of a color coat/clear coat finish. Typically, pigment in a pigment to binder weight ratio of about 1:100 to 200:100 can be used.

Both acrylic polymer A and acrylic crosslinking polymer B have a weight average molecular weight of about 5,000-40,000 and a number average molecular weight of about 2,000-15,000 and polymer C has a weight average molecular weight of about 300-10,000. Molecular weight is determined by gel permeation chromatography using polymethyl methacrylate as the standard.

One method for preparing the acrylic polymer A is to polymerize monomers of methyl methacrylate, alkyl methacrylate, alkyl acrylate or mixtures thereof, each having 2-12 carbon atoms in the alkyl group, and methacrylic acid or acrylic acid. Styrene also can be used in amounts of about 50% by weight of the polymer. The carboxyl groups of the resulting polymer are reacted with an alkylene imine preferably in a molar ratio of about 1:1 to form pendant amino ester groups from the backbone of the polymer.

The polymerization of the monomers to form the acrylic polymer A is carried out by conventional techniques in which the monomers, solvents and polymerization catalysts are charged into a polymerization vessel and reacted at about 50°-175° C. for about 0.5-6 hours to form the polymer.

Typical solvents used are toluene, xylene, ethyl acetate, acetone, methyl ethyl ketone, methyl isobutyl ketone, ethanol, isopropanol and other aliphatic, cycloaliphatic and aromatic hydrocarbon esters, ethers, ketones and alcohols as are conventionally used.

One preferred acrylic polymer contains about 20-35% by weight methyl methacrylate, 25-35% by weight of an alkyl methacrylate having 4-12 carbon atoms in the alkyl group such as butyl methacrylate, 30-40% styrene and 10-15% by weight methacrylic acid. The carboxyl groups of the polymer are post reacted with an alkylene imine such as propylene imine, preferably in a 1:1 molar ratio, to a provide amino ester groups pendant from the carbon-carbon polymer backbone of the formula

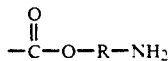

where R is an alkylene group having 2-3 carbon atoms.

Other useful acrylic polymers are the afornentioned acrylic polymers except that the aminoester group is replaced by hydroxy aminoester groups of the formula

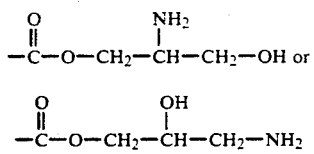

Such polymers are disclosed in DenHartog et al. U.S. Pat. No. 4,525,521 issued Jun. 25, 1985 which is hereby incorporated by reference.

Another useful type of acrylic polymer are the aforementioned acrylic polymers except that the aminoester group is replaced with groups of the formula

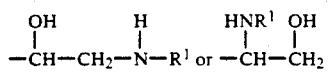

where $R^1$ is an alkyl group of 1-8 carbon atoms. Such polymers are disclosed in Snow U.S. Pat. No. 4,785,054 issued Nov. 15, 1988 which is hereby incorporated by reference.

The acrylic crosslinking polymer B is composed of polymerized monomers of at least 3% by weight of a glycidyl constituent which is either glycidyl methacrylate or glycidyl acrylate and optionally about 3-57% by weight of an alkyl methacrylate or acrylate having 1-4 carbon atoms in the alkyl group and pendant groups of the formula

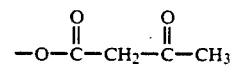

and the remainder of the monomers are alkyl methacrylate, alkyl acrylate or mixtures thereof where the alkyl group contains 1-12 carbon atoms.

Acetoacetoxy ethyl methacrylate or acetoacetoxyethyl acrylate are typically useful and preferred monomers that contain the aforementioned pendant group.

The acrylic crosslinking polymer can also be formed by preparing a hydroxyl containing acrylic polymer and reacting the hydroxyl groups of the polymer with a diketene or with an alkylate of acetoacetic acid such as methyl acetoacetate or t-butyl acetoacetate. A blocked ketene such as 2,2,6 trimethyl-4H-1,3 dioxin-4-one may also be used.

Useful acrylic crosslinking polymers are composed of polymerized monomers of about 3-80% by weight, based on the weight of the polymer, of glycidyl methacrylate or acrylate, 15-40% by weight, based on the weight of the polymer of an alkyl methacrylate having 1-12 carbon atoms, preferably 4-12 carbon atoms, in the alkyl group such as butyl methacrylate and 3-57% by weight, based on the weight of the polymer of acetoacetoxy ethyl methacrylate.

The following are examples of preferred acrylic crosslinking polymers:
45% glycidyl methacrylate/40% butyl methacrylate/15% acetoacetoxy ethyl methacrylate,
50% glycidyl methacrylate/40% butyl methacrylate/10% acetoacetoxy ethyl methacrylate,
55% glycidyl methacrylate/40% butyl methacrylate/5% acetoacetoxy ethyl methacrylate.

Other useful acrylic crosslinking are as follows:
30% glycidyl methacrylate/40% butyl methacrylate/30% acetoacetoxy ethyl methacrylate,
3% glycidyl methacrylate/40% butyl methacrylate/57% acetoacetoxy ethyl methacrylate,
60% glycidyl methacrylate/40% butyl methacrylate.

The aforementioned percentages are weight percentages.

Typical alkyl methacrylate and alkyl acrylate monomers that are used to prepare the aforementioned polymers are ethyl methacrylate, propyl methacrylate, butyl methacrylate, isobutyl methacrylate, pentyl methacrylate, hexyl methacrylate, ethyl hexyl methacrylate, nonyl methacrylate, decyl methacrylate, lauryl methacrylate, ethyl acrylate, propyl acrylate, butyl acrylate, isobutyl acrylate, pentyl acrylate, hexyl acrylate, ethyl hexyl acrylate, nonyl acrylate, decyl acrylate, lauryl acrylate and the like.

Polymer C is formed by reacting a polyester or a polyesterurethane having at least two pendant hydroxyl groups per polymer molecule with an alkylate of acetoacetic acid such as methyl acetoacetate or t-butyl acetoacetate. A blocked ketene such as 2,2,6,trimethyl-4H-1,3 dioxin-4-one also may be used. For Polymer C, a hydrocarbon polyol having at least two pendant hydroxyl groups per molecule which are reacted with an alkylate of acetoacetic acid can also be used.

The following are examples of compounds with at least two pendant hydroxyl groups per molecule which can be used to form Polymer C: a polyurethane polyol e.g. "K-Flex" UD 320, a polyester polyol e.g. "Rucoflex" S-107-110 which is a neopentyl adipate polyol, "Rucoflex" S-1015 which is a mixed glycol adipate polyol, "Rucoflex" 1028-110 which is a saturated polyester diol, "Rucoflex" F-2311 which is an adipate triol, "Rucoflex" 2016-185 which is a branched aromatic polyol, "Rucoflex" F-2060 which is a lightly branched polyester polyols.

The following are examples of organic isocyanates that can be reacted with the aforementioned polyols to form polyurethanes that can be reacted with an alkylate of acetoacetic acid to form Polymer C: hexamethylene diisocyanate, bis (4-isocyanato cylclohexyl) methane, trimethyl hexamethylene diisocyanate, toluene diisocyanate, diphenylmethane diisocyanate, the isocyanurate trimer of hexamethylene diisocyanate and the biuret trimer of hexamethylene diisocyanate. When forming the polyurethane, the stoichiometric amount of isocyanate used must be such that the resulting polyurethane has at least two reactive hydroxyl groups per polymer molecule.

Examples of hydrocarbons containing at least two pendant hydroxy groups which when reacted with an alkylate of acetoacetic acid can be used as an equivalent of Polymer C are as follows: trimethylol propane, trimethylol ethane, glycerine, pentaerytheritol, propylene glycol and tris(hydroxyethyl) isocyanurate.

Preferably, Polymer C contains about 20-90% by weight of a compound having at least two pendant hydroxyl groups per molecule, 10-80% by weight of an alkylate of acetoacetic acid, 0-20 % by weight of a compound containing at least two pendant isocyanate groups and 0-20% by weight of a hydrocarbon containing at least two pendant hydroxyl groups.

The following are examples of polyesters useful as Polymer C:
75% by weight "Rucoflex S-107-110/25% by weight t-butyl acetoacetate,
75% by weight "Rucoflex S-1015-120/25% by weight t-butyl acetoacetate and 79% by weight "Rucoflex" S-1015-100/21% by weight methyl acetoacetate.

The following are examples of polyester-urethanes useful as Polymer C:
60% by weight "Rucoflex" S-107-110/4% by weight "K-Flex"UD-320/4% by weight trimethylol propane/14% by weight bis(4-isocyanato cyclohexyl) methane/ 18% by weight t-butyl acetoacetate,
60% by weight "Rucoflex" S-1015-120/4% by weight "K Flex" UD 320/ 4% by weight trimethylol propane/14% by weight bis(4-isocyanato cyclohexyl) methane/18% by weight t-butyl acetoacetate,
69% by weight "Rucoflex" 1015-S/1% by weight "K Flex" UD 320/2% by weight trimethylol propane/17% by weight bis(4-isocyanato cyclohexyl) methane/11% by weight t-butyl acetoacetate,
48% by weight "Rucoflex" 1015-S/4% by weight "K Flex" UD 320/7% by weight trimethylol propane/11% bis (4-isocyanato cylcohexyl) methane/30% by weight t-butyl acetoacetate.

The composition can contain up to 40% by weight and preferably 2-30% by weight, based on the weight of the binder, of an organo silane compound containing an epoxy group represented by the formula:

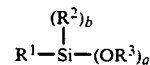

wherein $R^1$ is an organic group having an epoxy group, $R^2$ is hydrogen, a hydrocarbon group having 1-6 carbon atoms b is an integer of 0-2, $R^3$ is a hydrocarbon group having 1-5 carbon atoms or an alkoxyalkyl group, a is an integer of 1-3. Typical silanes are as follows:
glycidoxymethyl trimethoxysilane,
glycidoxymethyl triethoxysilane,
glycidoxyethyl triethoxysilane,
glycidoxypropyl trimethoxysilane,
glycidoxypropyl triethoxysilane,
glycidoxypropyl tri(methoxyethoxy)silane,
glycidoxypropyl triacetoxysilane,
glycidoxybutyl trimethoxysilane,
glycidoxymethyl dimethoxysilane,
glydidoxymethyl(ethyl)dimethoxysilane,
glycidoxymethyl(dimethyl)methoxysilane,
glycidoxyethyl(ethyl)dimethoxysilane,
glycidoxypropyl(ethyl)dimethoxysilane,
glycidoxybutyl(methyl)dimethoxysilane,
glycidylmethyl trimethoxysilane,
glycidylmethyl triethoxysilane,
glycidylethyl triethoxysilane,
glycidylpropyl triethoxysilane,
glycicylbutyl triethoxysilane,
3,4-epoxycyclohexylmethyl trimethoxysilane,
3,4-epoxycyclohexylethyl trimethoxysilane,
3,4-epoxycyclohexylpropyl trimethoxysilane,
3,4-epoxycyclohexylbutyl trimethoxysilane.

Preferred silanes are glycidoxypropyl trimethoxysilane and beta-(3,4-epoxycyclohexyl)ethyl trimethoxysilane since these silanes form finishes of excellent quality, durability and weatherability.

About 0.1-4% by weight, based on the weight of the binder, of a catalyst can be added to the coating composition. Typical catalysts are resorcinol, resorcinol monobenzoate, boron trifluoride amine complex, phenol, para methoxy phenol, parahydroxy methyl benzoate and hydroquinone.

As mentioned before, the composition can contain pigments. These pigments can be introduced into the composition by first forming a mill base with any of the polymers utilized in the composition or with other compatible polymers or polymer dispersants by conventional techniques, such as sand-grinding, ball milling, attritor grinding, two roll milling to disperse the pigments. The mill base is blended with the film-forming constituents as shown in the following Examples.

Any of the conventional pigments used in coating compositions can be utilized in the composition such as the following: metallic oxides, such as titanium dioxide, zinc oxide, iron oxide and the like, metal hydroxide, metal flakes such as aluminum flake, chromates, such as lead chromate, sulfides, sulfates, carbonates, carbon black, silica, talc, china clay, phthalocyanine blues and greens, organo reds, organo maroons, pearlescent pigments and other organic pigments and dyes.

To improve weatherability of finishes of the coating composition about 0.1-5%, by weight, based on the weight of the binder, of an ultraviolet light stabilizer or a combination of ultraviolet light stabilizers can be added. Typically useful ultra-violet light stabilizers are disclosed hereinafter.

The coating composition of this invention can be applied over a variety of substrates, such as metal, glass, plastic, reinforced plastic and the like, by any of the conventional application methods, such as spraying, electro-static spraying, dipping, brushing, flow-coating and the like. The viscosity of the composition can be adjusted for any of these methods by adding solvents if necessary. Generally, the composition is utilized at a high solids content which keeps air pollution at a minimum level.

The coatings are usually dried at ambient temperatures and are tack free after about 1-4 hours and fully cured after about 4-7 days. The coatings can be baked at relatively low temperatures of about 65°-140° C. for about 15 minutes-2 hours. The resulting coating is about 0.1-5 mils thick but for most uses, a 1-3 mil thick coating is used. One technique that is used to insure that there will be no popping or cratering of the coating is to allow the solvents to flash off for at least 2 minutes before a second coating is sprayed on or otherwise applied, then waiting about 2-10 minutes before baking the coating to allow any residual solvents to flash off if the coating is to be baked. The resulting coating has good gloss and can be rubbed or polished with conventional techniques to improve the smoothness, appearance and gloss. The coating has good adhesion to substrates of all types, is hard and resistant to weathering, solvents, alkali, scratches and the like. These characteristics make the composition particularly useful as a finish for automobiles, trucks, airplanes, railroad equipment and for the repair of finishes of trucks and automobiles.

Another aspect of this invention is to utilize the composition as a clear coat/color coat finish for substrates. In this finish, a clear coat top layer is in firm adherence to a color coat layer that is in adherence with a substrate. The clear coat is a transparent film of the coating composition of this invention and the color coat is the coating composition of this invention and contains pigments in a pigment-to-binder ratio of about 1/100 to 150/100 and other additives.

The thickness of the fully cured color coat and clear coat can vary. Generally, the color coat is about 0.4-1.5 mils thick and preferably 0.6-1.0 mils thick and the clear coat is about 0.5-6.0 mils thick and preferably 0.8-2.0 mils thick. Any of the aforementioned conventional pigments can be used in the color coat including metallic flake pigments can be used. The clear coat can also contain transparent pigments, i.e., pigments having the same or similar refractive index as the binder of the clear coat and are of a small particle size of about 0.015-50 microns. Typical pigments that can be used in a pigment-to-binder weight ratio of about 1/100 to 10/100 are inorganic siliceous pigments, such as silica pigments. These pigments have a refractive index of about 1.4-1.6.

To form a durable finish, the clear coat and optionally, the color coat contain about 0.1-5% by weight based on the weight of the binder, of an ultraviolet light stabilizer Typical ultraviolet light stabilizers that are useful are as follows:

Benzophenones such as hydroxy dodecyloxy benzophenone, 2,4-dihydroxybenzophenone, hydroxybenzophenones containing sulfonic groups and the like.

Triazoles such as 2-phenyl-4-2',4'-dihydryoxylbenzoyl)-triazoles, substituted benzotriazoles such as hydroxy-phenyltriazoles and the like.

Triazines such as 3,5-dialkyl-4-hydroxyphenyl derivatives of triazine, sulfur containing derivatives of diallyl-4-hydroxy phenyl triazines, hydroxy phenyl-1,3,5-triazine and the like.

Benzoates such as dibenzoate of diphenylol propane, tertiary butyl benzoate of diphenylol propane, and the like.

Other ultraviolet light stabilizers that can be used include lower alkyl thiomethylene containing phenols, substituted benzenes such as 1,3-bis(2'-hydroxybenzoyl)benzene, metal derivatives of 3,5-di-t-butyl-4-hydroxy phenyl propionic acid,
asymmetrical oxalic acid, diarylamides,
alkylhydroxy-phenyl-thioalkanoic acid ester and the like.

Particularly useful ultraviolet light stabilizers that can be used are hindered amines of bipiperidyl derivatives such as those in Murayama et al., U.S. Pat. No. 4,061,616, issued Dec. 6, 1977.

One preferred combination of ultraviolet light stabilizer is a benzotriazole and a hindered amine light stabilizer and is preferably used in a weight ratio of about 1:1. The combination is used in an amount of about 1-4% by weight, based on the weight of the binder. One preferred benzotriazole is "Tinuvin" 328,2-(2 hydroxy-3,5-ditertiary amyl-phenol)-2H-benzotriazole and a preferred hindered amine is "Tinuvin" 292, bis(1,2,2,6,6-pentamethyl-4-piperidinyl)sebacate. Another preferred hindered amine is "Tinuvin" 770, di[4(2,2,6,6-tetramethyl piperdinyl)]sebacate.

The clear coat/color coat finish is applied by conventional spraying techniques and preferably the clear coat is applied to the color coat while the color coat is still wet. Other conventional application techniques can be used such as brushing, roller coating, electrostatic spraying the the like. The finish is then dried at ambient temperatures or can be used as indicated above.

The following Examples illustrate the invention. All parts and percentages are on a weight basis unless otherwise indicated. Molecular weights are determined by gel permeation chromatography using polymethyl methacrylate as the standard.

EXAMPLE 1

Acrylic polymer A solution was prepared by charging the following constituents into a reaction vessel equipped with a heating mantle, reflux condenser, thermometer and stirrer:

|  | Parts by Weight |
| --- | --- |
| Portion 1 | |
| Butyl acetate | 959.53 |
| Toluene | 367.08 |
| Isopropanol | 641.24 |
| Butyl methacrylate monomer (BMA) | 127.22 |
| Portion 2 | |
| Butyl methacrylate monomer | 817.23 |
| Methyl methacrylate monomer (MMA) | 755.55 |
| Styrene monomer (S) | 1066.42 |
| Methacrylic acid monomer (MAA) | 329.93 |
| Portion 3 | |
| 2,2'-Azobis(methylbutyronitrile) | 97.58 |
| Toluene | 295.06 |
| Portion 4 | |
| Methacrylic acid monomer | 48.81 |
| Toluene | 148.69 |

-continued

| | Parts by Weight |
|---|---|
| Portion 5 | |
| 2,2'-Azobis(methylbutyronitrile) | 1.17 |
| Toluene | 12.77 |
| Portion 6 | |
| Butyl acetate | 2160.71 |
| Portion 7 | |
| Propylene imine | 251.01 |
| Total | 8080.00 |

Portion 1 was charged into the reaction vessel and mixed and the resulting mixture was heated to its reflux temperature of about 90° C. Portion 2 wa premixed and slowly added at a uniform rate over a 90 minute period to the reaction vessel while maintaining the mixture at its reflux temperature. Portion 3 was premixed and fed into the reaction vessel simultaneously with Portion 2 over the same time period. Immediately after Portions 2 and 3 were added, Portion 4 was added over a 45 minute period while the reaction mixture was held at its reflux temperature and then the reaction mixture was held at its reflux temperature for an additional 30 minutes Portion 5 was added and then the reaction mixture was held at its reflux temperature for 45 minutes. Portion 6 was added and the reaction mixture was cooled to 60° C. and then Portion 7 was added and the reaction mixture was heated to its reflux temperature and held at this temperature until and acid no. of 2 was reached.

The resulting polymer solution had a polymer weight solids content of about 42%, a Gardner Holdt viscosity at 25° C. of about C +½ to D +½. The polymer had a composition of about 24% methyl methacrylate, 30% butyl methacrylate, 34% styrene and 12% methacrylic acid postiminated with propylene imine. The resulting polymer had an acid no. of about 2, a number average molecular weight of about 6,800 and a weight average molecular weight of about 10,600.

Crosslinking polymer solution 1 was prepared by charging the following constituents into a reaction vessel described above:

| | Parts by Weight |
|---|---|
| Portion 1 | |
| Butyl acetate | 745.00 |
| Toluene | 128.00 |
| Ethyl acetate | 207.00 |
| Portion 2 | |
| Glycidyl methacrylate monomer | 875.00 |
| Butyl methacrylate monomer | 777.00 |
| Acetoacetoxy ethyl methacrylate monomer | 291.00 |
| Butyl acetate | 280.00 |
| 2,2'-Azobis(methylbutyronitrile) | 93.00 |
| Portion 3 | |
| Butyl acetate | 72.00 |
| 2,2'-Azobis(methylbutyronitrile) | 24.00 |
| Portion 4 | |
| Butyl acetate | 510.00 |
| Propylene glycol monomethyl acetate | 242.00 |
| Total | 4244.00 |

Portion 1 was charged into the reaction vessel and heated to its reflux temperature Portion 2 was premixed and added at a uniform rate over a 2 hour period while maintaining the reaction mixture at its reflux temperature. Immediately after portion 2 was completely added, Portion 3 was added over a 30 minute period and then the reaction mixture was held at its reflux temperature for an additional 30 minutes. Portion 4 was added and the reaction mixture was cooled to room temperature.

The resulting polymer solution had a polymer solids of about 46% and a Gardner Holdt viscosity of about A. The composition of the polymer was 40% butyl methacrylate, 45% glycidyl methacrylate and 15% acetoacetoxy ethyl methacrylate and had a number average molecular weight of about 1,976 and a weight average molecular weight of about 5,303.

Crosslinking polymer solution 2 was prepared by charging the following constituents into a reaction vessel equipped as above:

| | Parts by Weight |
|---|---|
| Portion 1 | |
| "Rucoflex" S-107-110 (neopentyl adipate polyol) | 460.01 |
| "K Flex" UD-320 (aliphatic urethane diol) | 36.78 |
| Dibutyl tin dilaurate | 0.03 |
| Trimethylol propane | 28.01 |
| Toluene | 25.08 |
| Portion 2 | |
| Bis (4-isocyanato cyclohexyl) methane | 107.64 |
| Portion 3 | |
| t-Butyl acetoacetate | 140.03 |
| Portion 4 | |
| Methyl ethyl ketone | 79.42 |
| Total | 877.00 |

Portion 1 was charged into the reaction vessel and heated to about 90° C. and water from the reaction was removed from the reaction mixture by azeotropic distillation. The temperature was then increased to 110° C. and Portion 2 was added at a uniform rate over a 30 minute period. The reaction was continued until no free isocyanate remained in the reaction mixture. Portion 3 was added over a 15 minute period while the reaction mixture was maintained at 110° C. The reaction mixture was held at this temperature for an additional two hours and then the mixture was cooled to 70° C. and Portion 4 was added.

The resulting polymer solution had a polymer solids of about 78% and a Gardner Holdt viscosity of about Z-3. The composition of the polymer was 60% "Rucoflex" S-107-110, 14% bis(4-isocyanato cyclohexyl) methane, 18% t-butyl acetoacetate, 4% "K-Flex"UD-320 and 4% trimethylol propane and the polymer had a number average molecular weight of about 3500 and a weight average molecular weight of about 6900.

The following Crosslinking Polymer Blends I, II and III were prepared by blending together the following constituents:

| | Crosslinking Blends | | |
|---|---|---|---|
| | I | II | III |
| | (Parts by Weight) | | |
| Crosslinking Polymer Solution 1 (prepared above) | 100 | 70 | 34 |
| Crosslinking Polymer Solution 2 (prepared above) | 0 | 30 | 41 |
| Glycidoxypropyl Trimethoxy Silane | 0 | 0 | 25 |
| Total | 100 | 100 | 100 |

A Clear Polymer Solution was prepared by blending the following constituents:

|  | Parts by Weight |
|---|---|
| Acrylic polymers A solution (prepared above) | 456.51 |
| Isopropanol | 9.86 |
| Propylene glycol monoethyl ether acetate | 31.86 |
| Hydrocarbon solvent | 10.50 |
| Mineral spirits (aromatic controlled) | 10.61 |
| UV Stabilizer ("Tinuvin" 328) | 2.72 |
| HALS light stabilizer ("Tinuvin" 292) | 2.72 |
| Flow control agent ("Acrylon" MFPF from Synthron) | 0.39 |
| Slip agent (BYK 325) | 0.53 |
| Non-Aqueous Dispersion Rheology Control Agent | 12.85 |
| Total | 538.55 |

A Thinner Solution was prepared by blending the following constituents:

|  | Parts by Weight |
|---|---|
| Propylene glycol monoethyl ether acetate | 30.78 |
| Hydrocarbon solvent | 26.69 |
| Ethyl 3-ethoxy propionate | 59.56 |
| Butyl Cellosolve Acetate | 1.12 |
| Catalyst solution (p-hydroxymethyl benzoate) | 7.74 |
| Total | 125.89 |

Coating Composition 1 was prepared by blending together about 67.38 parts of the Clear Polymer Solution (prepared above), 15.78 parts of the Thinner Solution (prepared above) and 16.84 parts of the Crosslinking Polymer Blend I (prepared above). This composition is the control.

Coating Composition 2 was prepared by blending together about 65.96 parts of the Clear Polymer Solution (prepared above), 16.41 parts of the Thinner Solution (prepared above) and 17.63 parts of the Crosslinking Polymer Blend II (prepared above). This composition represents the invention.

Coating Composition 3 was prepared by blending together about 65.71 parts of the Clear Polymer Solution (prepared above), 16.35 parts of the Thinner Solution (prepared above) and 17.93 parts of Crosslinking Polymer Blend III (prepared above). This composition represents a preferred composition of the invention.

Each of the above coating compositions was sprayed onto a separate primed steel panel coated with an acrylic lacquer pigmented finish and then cured for about 168 hours at room temperature. In each case, the resulting clear finish was about 2 mils thick. Each panel was tested for tape print resistance, water spot resistance, chip resistance, impact resistance, recoat lift resistance and flexibility. The tensile properties of a 2 mil free film of each of the coating compositions were measured.

Tape print resistance was determined by applying masking tape every 4 hours during a period of 8-24 hours after application of the finish. The tape was removed one hour after it was applied and then 1 hour after the tape was removed, the finish was inspected for printing resulting from the tape. The time at which no printing from the tape was noted and recorded below.

Water spot resistance was determined by applying 3 drops of distilled water every 4 hours after application of the finish and the water was allowed to evaporate. After the water evaporated the panel was inspected for distortion of the finish. The time at which no distortion from water was noted and shown below:

Flexibility was determined by bending a ⅛ inch thick 4×8 inch panel of reinforced injection molded plastic material coated with a 2 mil layer of the coating composition around a 6 inch diameter cylinder. The value recorded was the number of days that passed from the spraying of the panel until the coating on the panel cracked when bent.

Chip resistance was determined by a method very similar to ASTM D-3170 and was rated on a scale of 0-10 where 0 indicated that no paint remained on the panel and 10 indicated that no paint was chipped from the panel.

Impact resistance was measured by a method similar to ASTM D-2794-84 and values were recorded in inch pounds.

Recoat lift was measured by sanding through the coating to the substrate with a smooth feather-edge at various times after initially spraying the coating. Another layer of topcoat was then applied to the sanded area. Lifting of the applied coating was rated on a 0-5 scale where 0 denoted no lifting of the dried coating and 5 denoted lifting of the coating over the entire panel.

| Test | Chip Resistance | Impact (in-lbs) | | Flex (Days) |
|---|---|---|---|---|
|  |  | Forward | Reverse |  |
| Coating Comp. 1 (control) | 3 | <10 | <10 | 1 |
| Coating Comp. 2 (invention) | 4 | 35 | 70 | 10 |
| Coating Comp. 3 (pref. invention) | 4 | 10 | 45 | 7 |

|  | Recoat Lift At 4 days | Tape Print (1) | Water Spot Resistance (2) |
|---|---|---|---|
| Coating Comp. 1 (control) | 2 | 8 | 8 |
| Coating Comp. 2 (invention) | 0 | 8 | 8 |
| Coating Comp. 3 (pref. invention) | 0 | 8 | 8 |

(1) Time in hours when tape did not imprint finish.
(2) Time in hours when water did not spot finish.

Tensile properties measured on an Instron Model 4201 are shown below:

|  | Peak Stress (lbs/sq in.) | | Break at Elongation (%) | |
|---|---|---|---|---|
|  | 8 Days | 30 Days | 8 Days | 30 Days |
| Coating Comp. 1 (control) | 3300 | 2210 | 13 | 6 |
| Coating Comp. 2 (invention) | 1930 | 3430 | 56 | 12 |
| Coating Comp. 3 | 2290 | 4060 | 64 | 15 |

Other properties of the each of the finishes were tested such a gloss, distinctness of image, durability, chemical resistance and adhesion. These properties were acceptable for an automotive quality finish.

EXAMPLE 2

Acrylic polymer B solution was prepared following the general procedure described in Example 1. The resulting polymer solution had a polymer weight solids content of about 42% and a relative viscosity measured at 25° C. of 1.070. The polymer had a composition of about 34% methyl methacrylate, 30% butyl methacrylate, 24% styrene and 12% methacrylic acid postiminated with propylene imine. The polymer had an acid no. of about 2, a number average molecular weight of about 5,000 and a weight average molecular weight of about 8,031.

Crosslinking polymer solution 4 was prepared according to the general procedure outlined by Den Hartog in U.S. Pat. No. 4,525,521 Example 2. The resulting polymer solution had a polymer weight solids content of about 52% and a relative viscosity measured at 25° C. of 1.055. The polymer had a composition of about 40% Butyl methacrylate and 60% glycidyl methacrylate with a number average molecular weight of about 6600 and a weight average molecular weight of about 13360.

Crosslinking polymer solution 5 was prepared by charging the following ingredients into a reaction vessel equipped as above:

|  | Parts by Weight |
|---|---|
| Portion 1 |  |
| Rucoflex S-1015-100 (mixed glycol adipate polyol) | 1000.00 |
| Portion 2 |  |
| Methyl acetoacetate | 265.10 |
| Trichloroacetic acid | 1.02 |
| Total | 1266.12 |

Portion 1 was charged into the reactor, blanketed with N₂ and heated to around 180° C. Portion 2 was then added at a uniform rate over a 120 minute period while methanol was distilled off. The mixture was held at 180° C. about an additional 30 minutes or until methanol no longer distilled off. The mixture was then cooled to room temperature.

The resulting polymer had a polymer solids of about 91% and a Gardener Holdt viscosity of about U-V. The composition of the polymer was 79% Rucoflex S-107-110 and 21% methyl acetoacetate. The resulting polymer had a number average molecular weight of about 1800 and a weight average molecular weight of about 4050.

Crosslinking polymer blends were produced by combining crosslinking polymer solutions 4 and 5 in the following amounts:

| Parts by Weight | Crosslinking Blends IV | V |
|---|---|---|
| Solution 4 | 100 | 23 |
| Solution 5 | 0 | 77 |

A Pigmented Polymer solution was prepared following the general procedures described in U.S. Pat. No. 4,525,521 Examples 1 and 2.

Thinner Solution 2 was prepared by blending the following constituents:

|  | Parts by Weight |
|---|---|
| Ethyl 3-ethoxy propionate | 22.69 |
| Mineral spirits, Aromatic controlled | 23.30 |
| Ethylene glycol monobutyl ether acetate | 19.69 |
| Methyl ethyl ketone | 14.07 |
| Toluene | 10.81 |
| Hydrocarbon Solvent | 6.04 |
| Ethylene glycol monobutyl ether | 3.40 |
| Total | 100.00 |

Pigmented coating composition 4 was prepared by mixing 67.81 parts of the Pigmented Polymer Solution, 23.17 parts of Thinner Solution 2 and 9.02 parts of crosslinked polymer blend IV together. This composition was the control.

Pigmented coating composition 5 was prepared by mixing 67.81 parts of the Pigmented Polymer Solution, 23.17 parts of Thinner solution 2 and 9.21 parts of crosslinking polymer blend V together.

About 2 mils of each pigmented coating composition was spray applied to a separate primed steel panel and then cured for about 168 hours at room temperature. Each coated panel was tested as in Example 1 for flexibility, chip resistance, impact resistance, and tape print resistance. The results are shown below.

|  | Chip Resistance | Impact (in-lbs) Forward | Reverse | Flex (Days) | Tape Print Resistance (1) |
|---|---|---|---|---|---|
| Coating Comp 4 | 5 | 20 | 10 | 0.5 | 22–24 |
| Coating Comp 5 | 7 | 80 | 80 | >21 | 8 |

(1) Time in hours when tape did not imprint finish.

Gloss, distinctness of image, durability, chemical resistance, and adhesion of each of the coated panels was measured and each were acceptable for an automotive quality finish.

We claim:

1. A coating composition comprising 20–80% by weight of a binder and 80–20% by weight of a solvent for the binder, wherein the binder consists essentially of about:

A. 50–70% by weight, based on the weight of the binder, of an acrylic polymer A consisting essentially of polymerized monomers of methyl methacrylate and monomers selected from the group consisting of styrene, alkyl methacrylate and alkyl acrylate each having 2–12 carbon atoms in the alkyl group and said polymer having pending from the carbon-carbon atoms of the polymer backbone reactive groups selected from the group consisting of aminoester groups of the formula

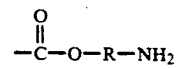

where R is an alkylene group having 2–3 carbon atoms, hydroxyamino ester groups of the formula

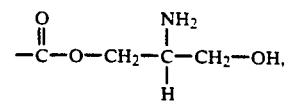

-continued

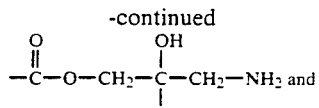

groups of the formula

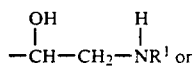

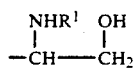

where $R^1$ is an alkyl group of 1-8 carbon atoms;

B. 20-30% by weight, based on the weight of the binder, of an acrylic crosslinking polymer B comprising polymerized monomers of at least 3% by weight, based on the weight of the crosslinking polymer, of a glycidyl constituent selected from the group consisting of glycidyl methacrylate and glycidyl acrylate, and the remainder of the monomers being selected from the group consisting of alkyl methacrylate and alkyl acrylate or mixtures thereof each having 1-12 carbon atoms in the alkyl groups; and C. 5-48% by weight, based on the weight of the binder, of polymer C of a polyester or polyesterurethane polymer having at least 2 pendant groups of the formula

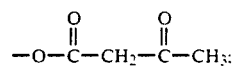

wherein said polymers A and B each have a weight average molecular weight of about 5,000-40,000 and polymer C has a weight average molecular weight of about 300-10,000 each determined by gel permeation chromatography using polymethyl methacrylate as a standard.

2. The coating composition of claim 1 containing pigments in a pigment-to-binder weight ratio of 1:100 to 200:100.

3. The coating composition of claim 1 in which the acrylic polymer A consists essentially of polymerized monomers of methyl methacrylate and monomers selected from the group consisting of styrene, alkyl methacrylate and alkyl acrylate, each having 2-12 carbon atoms in the alkyl group and said polymer having pending from the carbon-carbon atoms of the polymer backbone reactive aminoester groups of the formula

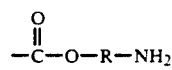

where R is an alkylene group having 2-3 carbon atoms.

4. The coating composition of claim 3 in which the acrylic polymer A consists essentially of about 20-35% by weight, based on the acrylic polymer, of methyl methacrylate 30-40% by weight, based on the weight of the acrylic polymer, of styrene, 25-35% by weight, based on the weight of the acrylic polymer, of an alkyl methacrylate having 4-12 carbon atoms in the alkyl group and 10-15% by weight, based on the weight of the acrylic polymer, of methacrylic acid; said polymer reacted with an alkylene imine to provide said amino ester groups.

5. The coating composition of claim 1 in which the acrylic polymer A consists essentially of polymerized monomers of methyl methacrylate and monomers selected from the group consisting of styrene, alkyl methacrylate and alkyl acrylate, each having 2-12 carbon atoms in the alkyl group and said polymer having pending from the carbon-carbon atoms of the polymer backbone hydroxyamino ester groups of the formula

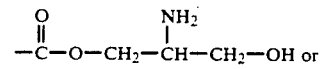

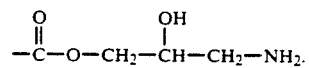

6. The coating composition of claim 1 in which the acrylic polymer A consists essentially of polymerized monomers of methyl methacrylate and monomers selected from the group consisting of styrene, alkyl methacrylate and alkyl acrylate, each having 2-12 carbon atoms in the alkyl group and said polymer having pending from the backbone groups of the formula

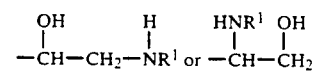

where $R^1$ is an alkyl group of 1-8 carbon atoms.

7. The coating composition of claim 3 in which the acrylic crosslinking polymer B consists essentially of about 3-80% by weight, based on the weight of the acrylic crosslinking polymer, of glycidyl methacrylate, or glycidyl acrylate 15-40% by weight, based on the weight of the acrylic crosslinking polymer, of an alkyl methacrylate having 1-12 carbon atoms in the alkyl group and 30-57% by weight, based on the weight of the acrylic crosslinking polymer of an alkyl methacrylate or alkyl acrylate each having 1-4 carbon atoms in the alkyl group and each having a pendant group of the formula

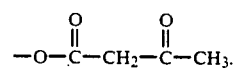

8. The coating composition of claims 4, 5 or 6 in which the acrylic crosslinking polymer B consists essentially of about 3-80% by weight based on the weight of the acrylic crosslinking polymer, of glycidyl methacrylate, 15-40% by weight, based on the weight of the acrylic crosslinking polymer, of an alkyl methacrylate having 4-12 carbon atoms in the alkyl group and 3-57% by weight, based on the weight of the acrylic crosslinking polymer of acetoacetoxy ethyl methacrylate or acetoacetoxy ethyl acrylate.

9. The coating composition of claim 1 in which polymer C comprises a polyester having reactive hydroxyl groups of an aliphatic diol and an aliphatic dicarboxylic acid wherein the hydroxyl groups have been reacted with an alkylate of acetoacetic acid or an alkyl acetoacetate.

10. The coating composition of claim 9 in which polymer C comprises neopentyl adipate polyol reacted with butyl acetoacetate.

11. The coating composition of claim 1 in which polymer C comprises a polyesterurethane of a polyester of an aliphatic diol and an aliphatic dicarboxylic acid reacted with an organic diisocyanate and an alkylate of acetoacetic acid.

12. The coating composition of claim 1 in which polymer C is a polyesterurethane which comprises the reaction product of neopentyl glycol adipate, an aliphatic polyurethane polyol, trimethylol propane, cycloaliphatic diisocyanate that is subsequently reacted with an alkylate of acetoacetic acid.

13. The coating composition of claim 1 containing about 2-30% by weight, based on the eight of the binder of an organosilane of the formula

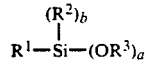

wherein $R^1$ is an organic group having an epoxy group, $R^2$ is hydrogen, a hydrocarbon group having 1-6 carbon atoms b is an integer of 0-2, $R^3$ is a hydrocarbon group having 1-5 carbon atoms or an alkoxyalkyl group, a is an integer of 1-3.

14. The coating composition of claim 13 wherein the organosilane is selected from the group consisting of glycidoxypropyl trimethoxysilane and beta-(3,4-epoxy cyclohexyl)ethyl trimethoxysilane.

15. The coating composition of claim 1 containing about 0.1-4% by weight, based on the weight of the binder, of a catalyst selected from the group consisting of resorcinol, resorcinol monobenzoate, boron trifluoride amine complex, phenol, para methoxy phenol, and parahydroxymethyl benzoate.

16. The coating composition of claim 1 containing 0.1-5% by weight, based on the weight of the binder, of ultraviolet light stabilizer.

17. The coating composition of claim 2 in which the binder consists essentially of
A. acrylic polymer A consist essentially of about 20-35% by weight, based on the weight of the acrylic polymer, of methyl methacrylate, 30-40% by weight, based on the weight of the acrylic polymer, of styrene, 25-35% by weight, based on the weight of the acrylic polymer, of alkyl methacrylate methacrylate having 4-12 carbon atoms in the alkyl group and 10-15% by weight, based on the weight of the acrylic polymer, of methacrylic acid; said polymer reacted with an alkylene imine to provide amino ester groups pendant from the carbon-carbon polymer backbone of the formula

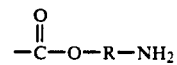

where R is an alkylene group having 2-3 carbon atoms;
B. acrylic crosslinking polymer B consists essentially of about 3-80% by weight, based on the weight of the acrylic crosslinking polymer, of glycidyl methacrylate, 15-40% by weight, based on the weight of the acrylic crosslinking polymer, of alkyl methacrylate having 4-12 carbons in the alkyl group and 5-57% by weight, based on the weight of the acrylic crosslinking polymer, of acetoacetoxy ethyl methacrylate and
C. crosslinking polymer C consists essentially of a polyester urethane of a polyester of neopentyl glycol adipate, aliphatic urethane diol, trimethylol propane and a cyclohexyl diisocyanato that is subsequently reacted with an alkyl acetoacetate.

18. A substrate coated with a dried layer of the composition of claim 1.

19. The coated substrate of claim 18 in which the substrate is a metal.

20. The coated substrate of claim 18 in which the substrate is a plastic.

21. A substrate coated with a dried layer of a pigmented composition and having a second dried clear layer of the coating composition of claim 1 in superimposed adherence thereto.

* * * * *